June 15, 1926.

G. J. RACKHAM 1,588,906

DOUBLE DECK VEHICLE

Filed Oct. 16, 1924

Inventor:
George J. Rackham.
by Banning & Banning
Attys

June 15, 1926.

G. J. RACKHAM 1,588,906

DOUBLE DECK VEHICLE

Filed Oct. 16, 1924    3 Sheets-Sheet 3

Inventor:
George J. Rackham.
by Banning & Banning
Attys.

Patented June 15, 1926.

1,588,906

UNITED STATES PATENT OFFICE.

GEORGE JOHN RACKHAM, OF CHICAGO, ILLINOIS, ASSIGNOR TO YELLOW COACH MANUFACTURING CO., OF CHICAGO, ILLINOIS, A CORPORATION OF ILLINOIS.

DOUBLE-DECK VEHICLE.

Application filed October 16, 1924. Serial No. 743,857.

In the construction of double deck vehicles, a number of different expedients have been adapted in the effort to reduce the overall height of the vehicle and at the same time to afford full standing head-room in the aisles which is required to permit movement of passengers from end to end of the vehicle. In the effort to secure this result, it has been customary in the past to provide a lower compartment having a center aisle of full height extending into the space between the upper seats which in this case, however, must be of the bench variety extending longitudinally of the vehicle or car. Certain modifications of this idea have been devised in which two lower outer aisles are provided, each of which extend up under an upper longitudinally extending side seat on the upper deck. Heretofore, so far as I am advised, no effort has been directed to the provision of cross seats in combination with upper and lower aisles each affording full head-room, and the present invention is directed to such an arrangement.

In order to reduce the height of the vehicle as a whole with an arrangement of this character, it is necessary to locate the upper and lower aisles out of vertical coincidence with one another, unless the floor of the lower aisle be lowered below its normal level, but the preferred embodiment is one which obviates the necessity for thus introducing abnormal features into the structure of the vehicle as a whole. In arranging the aisles out of vertical coincidence, it will be found that some of the cross seats will be afforded full standing head-room, while in the case of others sitting head-room only is afforded, which, however, is unobjectionable where easy access to the aisles is afforded. At the same time the arrangement is one which affords a full quota of cross seats, so that the capacity of the vehicle is equal to that of double deck vehicles of the ordinary type in which full head-room is afforded to all the seats, both upper and lower. The invention is one which is susceptible of embodiment in a large number of variations, all of which, however, are obvious adaptations of the basic ideas involved.

Figure 1:
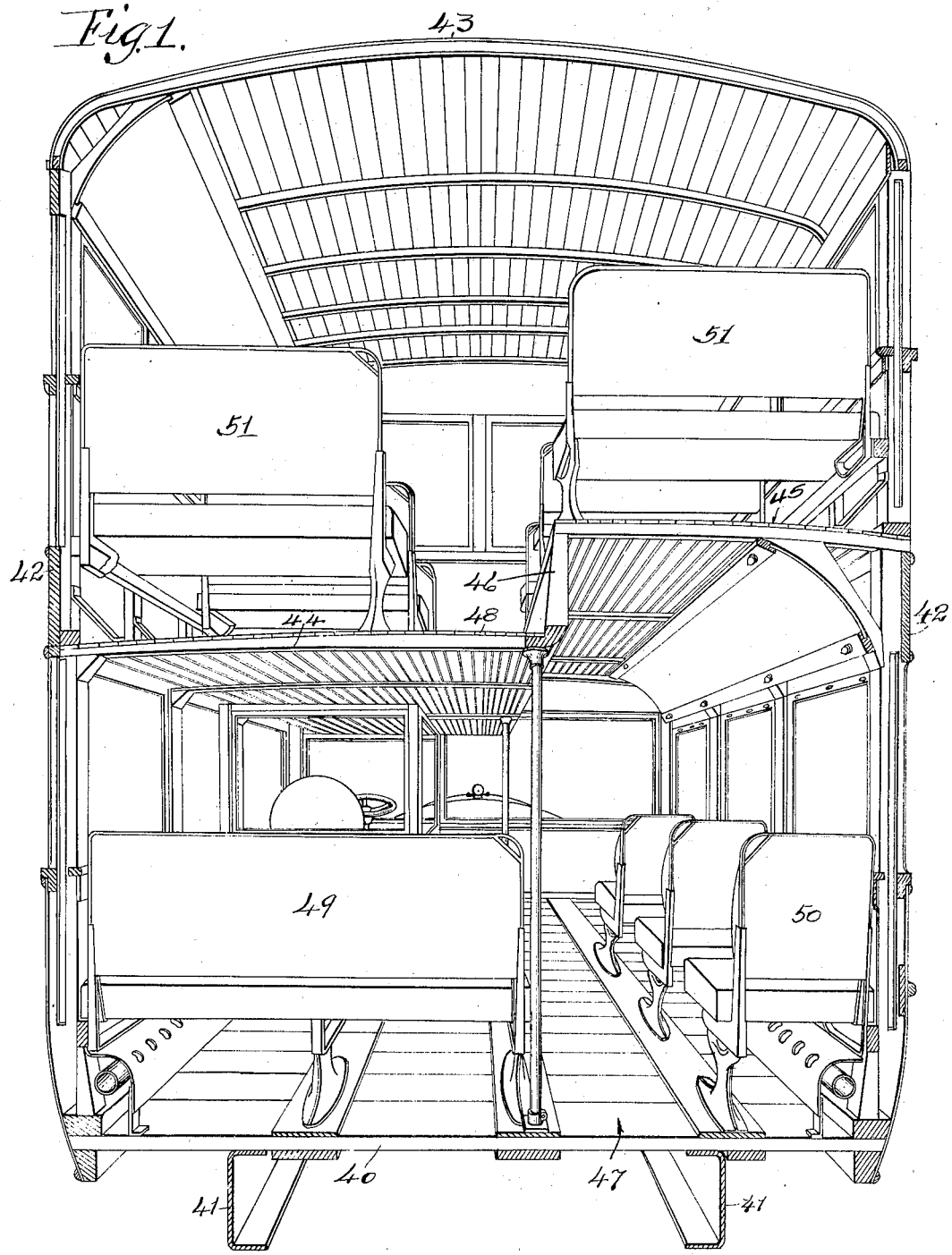
Figure 1 is a perspective view of the interior of a motor coach or the like showing the preferred embodiment of the invention.
Figure 2:
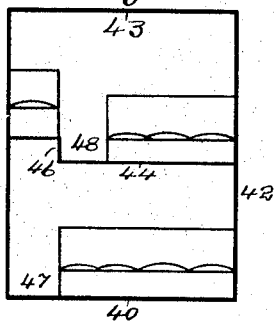
Figs. 2 to 11 are diagrammatic views showing modifications of the seat and aisle arrangement of Fig. 1.
Figure 3:
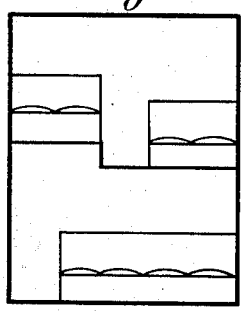
Figure 4:
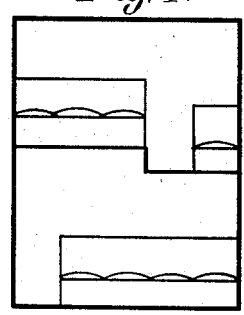
Figure 5:
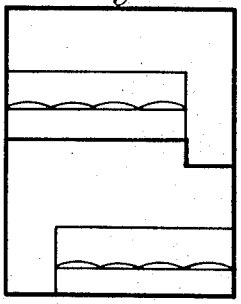
Figure 6:
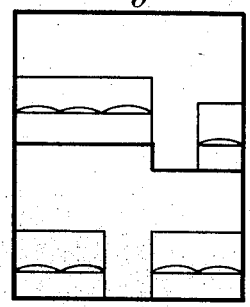
Figure 7:
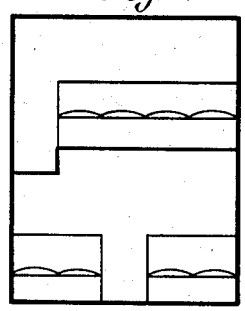
Figure 8:
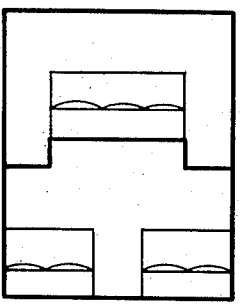
Figure 9:
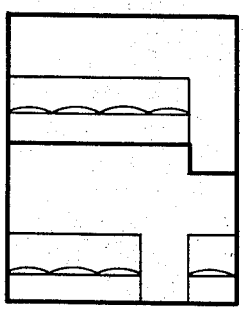
Figure 10:
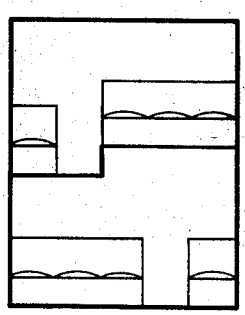
Figure 11:
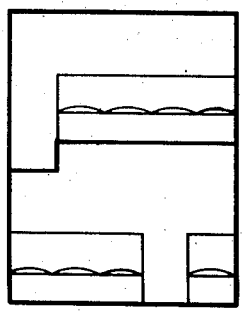
Figure 12:
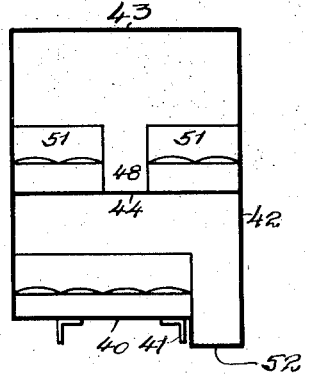
Figs. 12 to 16 are modifications which require a lowering of the floor for the lower aisle below the normal level of the vehicle body.
Figure 13:
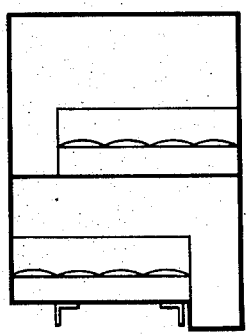
Figure 14:
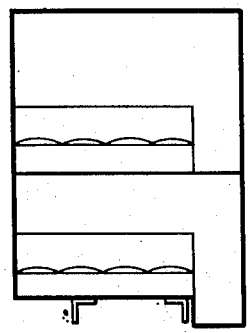
Figure 15:
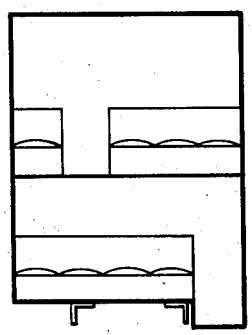
Figure 16:
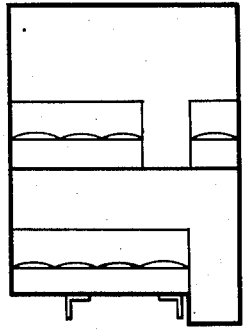

As shown in Fig. 1, the vehicle—a motor bus, street car, or the like—is provided with a lower floor 40 carried by sills 41, which latter constitute a part of the chassis, the running gear being omitted. The vehicle is provided with windowed side walls 42 which extend practically the full height of the vehicle and are overtopped by a roof 43. The vehicle is divided into lower and upper stories by the provision of an upper floor which comprises a lower section 44 and an upper section 45 which are vertically offset to afford a longitudinally extending step 46. The upper and lower floor sections extend from end to end of the vehicle unbroken by cross offsets or the like.

The provision of the upper floor divides the vehicle in such a way as to provide full standing head-room for the lower floor on one side of the step or offset and full standing head-room for the upper floor on the other side of the step or offset. A longitudinally extending portion of the floor underlying the elevated portion of the upper floor constitutes the lower aisle 47, and similarly a portion of the depressed section of the upper floor affording full head-room constitutes the upper aisle 48.

As shown in Fig. 1, the longitudinally extending step in the upper floor is so located as to divide the vehicle longitudinally into a right-hand section comprising two-fifths of the complete width and a left section comprising three-fifths. Such an arrangement, therefore, makes provision for the employment in the lower story of the car or vehicle of a row of bodily elevated forwardly facing triple cross seats 49 along the left side of the car and a row of bodily elevated forwardly facing single cross seats 50 along the right side of the car immediately adjacent to the windows. The upper story makes provision for two rows of bodily elevated forwardly facing double cross seats 51—51 with the upper aisle extending directly down the middle of the car.

In Figs. 2 to 11 are shown a large number of modifications of the arrangement heretofore described in all of which it will be observed that the upper floor is stepped to afford vertically overlapping standing height sections for the lower and upper stories so that in all cases some of the seats will be afforded full standing head-room, while others will be afforded sitting head-room only. It is believed that the various modifications of this idea are self-evident from an inspection of the diagrammatic views and that detailed description of each will not be necessary.

In Figs. 12 to 16 is shown an arrangement in which the lower floor is stepped downwardly outside of one of the side sills of the chassis to afford a side aisle 52 having full standing room. In this case, it will be noted that all of the upper seats are afforded full standing head-room and all of the lower seats are afforded only sitting head-room. This arrangement in some cases may be deemed objectionable, in that it necessitates a departure from recognized body designs and introduces complications of construction, but, for some purposes, this design may prove satisfactory. The structure, in any of the designs shown, is one which secures the comforts and convenience of forwardly facing bodily elevated cross seats, all having adequate head-room with a reduced overall height which is frequently necessitated by over-head structures, such as bridges, telegraph wires and the like, and at the same time unifies the construction in such a way as to improve the appearance of the vehicle as a whole in comparison with the vehicle employing make-shift shelters, such as canopies, or the like, for the upper deck.

Although numerous modifications in the main idea have been illustrated, it is not the intention to confine the invention to the particular arrangements shown, since other adaptations of the same general idea may be found available.

I claim:

1. A double deck vehicle including a lower deck placed entirely on a single level, and provided with two series of forwardly facing seats located along its side walls with a longitudinally extending aisle between said series of seats, said aisle being located substantially in the central portion of the vehicle and away from the side walls, and said vehicle including an upper deck reaching in a single level over one of said lower deck series of seats and over the lower deck aisle, and being of reduced elevation over the other lower deck series of seats, and two series of forwardly facing seats located along the side walls of the upper deck, one of said series of seats fully occupying the first mentioned portion of the upper deck, and the other of said series of upper deck seats occupying that portion of the reduced elevation part of the upper deck which is located against the outer wall of the vehicle.

2. A double deck vehicle including a lower deck placed entirely on a single level, and provided with two series of transversely extending seats located along its side walls with a longitudinally extending aisle between said series of seats, said aisle being located away from both of the side walls of the vehicle, and said vehicle including an upper deck reaching in a single level over one of said lower deck series of seats and over the lower deck aisle, and being of reduced elevation over the other lower deck series of seats, and two series of transversely extending seats located along the side walls of the upper deck, one of said series of seats fully occupying the first mentioned portion of the upper deck, and the other of said series of upper deck seats occupying that portion of the reduced elevation part of the upper deck which is located against the outer wall of the vehicle, and leaving the inner side of the reduced elevation part of the upper deck unoccupied by seats to thereby provide an upper deck aisle of reduced elevation.

3. A double deck vehicle including a lower deck placed entirely on a single level, and provided with two series of transversely extending seats located along its side walls with a longitudinally extending aisle between said series of seats, said aisle being located away from both of the side walls of the vehicle, and said vehicle including an upper deck reaching in a single level over one of said lower deck series of seats and over the lower deck aisle, and being of reduced elevation over the other lower deck series of seats, and a series of transversely extending seats fully occupying the first mentioned portion of the upper deck, the second mentioned portion of the upper deck establishing an upper deck aisle of reduced elevation over the second lower deck series of seats.

GEORGE JOHN RACKHAM.